(12) United States Patent
Graef et al.

(10) Patent No.: US 7,717,406 B2
(45) Date of Patent: May 18, 2010

(54) ALGAE RESISTANT EDGE COATING AND METHOD OF FORMING SAME

(75) Inventors: Patricia Thomas Graef, Fort Myers, FL (US); Ian Cameron, Andrews, NC (US); Larry Drummond, Cape Coral, FL (US)

(73) Assignee: Munters Corporation, Fort Myers, FL (US)

( * ) Notice: Subject to any disclaimer, the term of this patent is extended or adjusted under 35 U.S.C. 154(b) by 863 days.

(21) Appl. No.: 11/518,959

(22) Filed: Nov. 6, 2006

(65) Prior Publication Data

US 2009/0032981 A1 Feb. 5, 2009

(51) Int. Cl.
*B01F 3/04* (2006.01)
(52) U.S. Cl. .................. 261/112.2; 427/284
(58) Field of Classification Search .............. 261/112.2; 427/256, 284
See application file for complete search history.

(56) References Cited

U.S. PATENT DOCUMENTS

| | | | | |
|---|---|---|---|---|
| 3,286,999 A | | 11/1966 | Takeda | 261/112.2 |
| 3,395,903 A | | 8/1968 | Norback et al. | 261/112.2 |
| 3,500,615 A | | 3/1970 | Meek | 261/112.2 |
| 3,862,280 A | * | 1/1975 | Polovina | 261/112.2 |
| 5,248,454 A | | 9/1993 | Thomas | 261/112.2 |
| 2003/0203183 A1 | * | 10/2003 | Hester et al. | 428/315.5 |

* cited by examiner

*Primary Examiner*—Scott Bushey
(74) *Attorney, Agent, or Firm*—Fitzpatrick, Cella, Harper & Scinto

(57) ABSTRACT

A gas-liquid contact body for use in a gas-liquid contact apparatus is formed of a plurality of facially opposed corrugated sheets with the corrugations in alternate sheets being disposed in parallel to form a plurality of criss-crossing channels for gas and liquid. The contact body has an air inlet side including an air inlet portion which is coated with a water-impermeable hydrophilic material whose density on the surface of the sheets decreases from a maximum at the edge of the sheets downstream within the air inlet portion to leave progressively increasing areas of said sheet exposed to air.

7 Claims, 4 Drawing Sheets

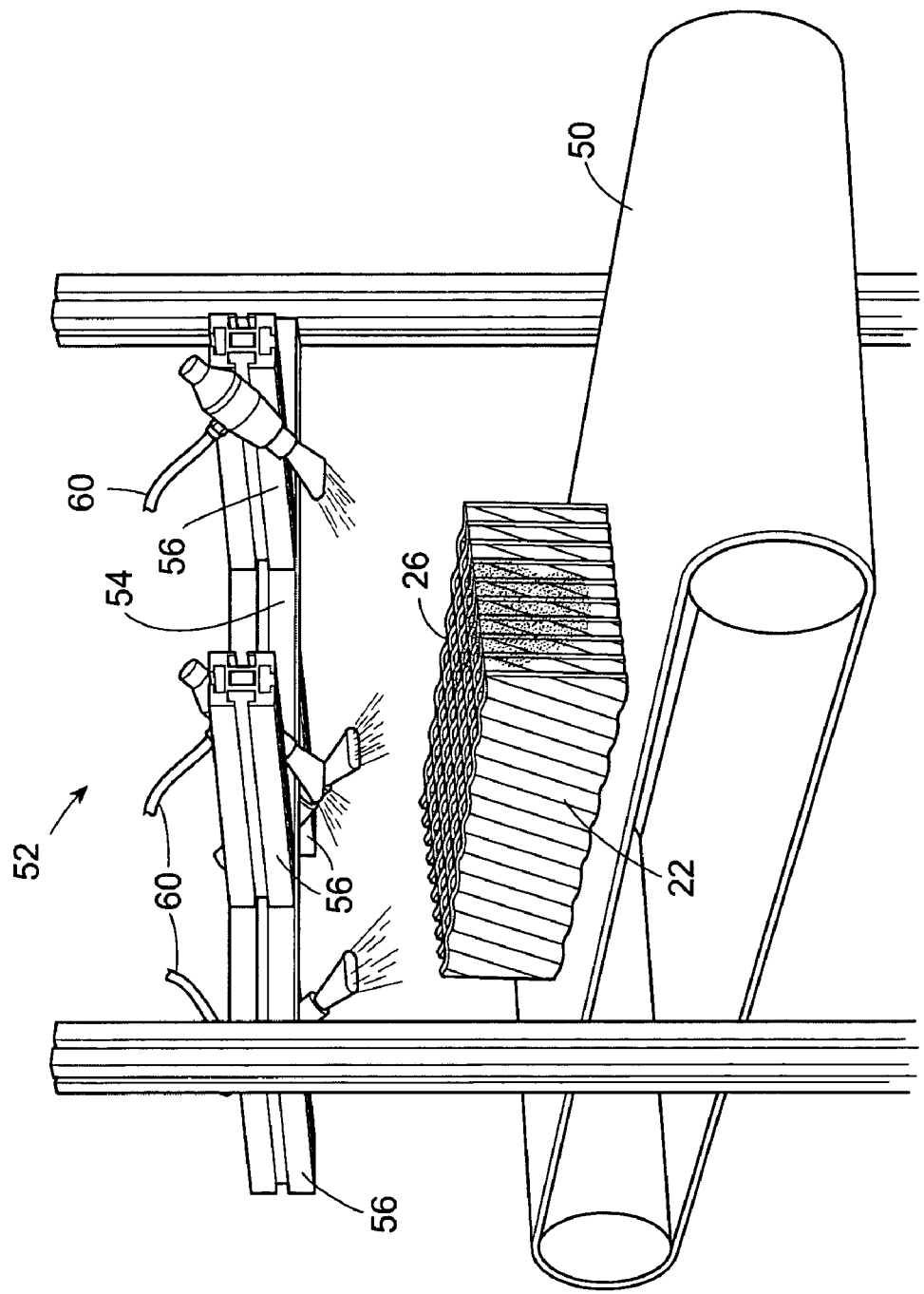

ALGAE RESISTANT EDGE COATING AND METHOD OF FORMING SAME

SUMMARY OF THE INVENTION

The present invention relates to contact bodies for evaporative cooling apparatus and the like and a method of forming the coating.

BACKGROUND OF THE INVENTION

Field of the Invention

Cooling towers and evaporative coolers or the like remove heat from water by causing water to gravitate through a fill assembly in heat exchange relationship with currents of air. As a result the temperature of the water is lowered by the surface evaporation of the water before being returned to the equipment employing the water for various thermal interchange functions.

It has been well known to form contact bodies for use in these apparatus from a plurality of sheets of corrugated materials defining a plurality of channels or ducts in the contact body through which gas and liquid are passed. One such well known contact body is disclosed for example in U.S. Pat. No. 3,500,615. Such contact bodies are formed from a range of materials including Kraft paper, fiberglass, plastic, and other materials often porous materials as well as impregnated materials as shown for example in U.S. Pat. No. 3,862,280.

Gas contact bodies of this type have distinct advantages in cooling towers and evaporative cooling apparatus. Among the few disadvantages are that such contact bodies also serve as excellent air filters and breeding grounds for algae. This is particularly true along the air inlet side of the contact body which encounters the most dirt and atmospheric impurities, and is also exposed to sunlight. Accordingly, this portion of the contact body is subject to contamination and clogging as a result of dust and dirt entering the contact body.

To combat this problem and to remove the dust and dirt filtered from the air, it has previously been proposed to flush the contact body with copious amounts of water. If this is not done and the debris is allowed to dry on the substrate of the contact body (particularly if it is a porous substrate such as Kraft paper, fiberglass or cotton) the dust, dirt, spores and minerals captured by the contact body will deposit and solidify throughout the fibers of the contact body sheets. These deposits then are difficult to remove without destroying the fiber substrate. If left unattended, the air entering face of the media eventually may be completely clogged.

In addition to contamination from dirt and other airborne impurities, it has been found that algae will form at the interface between the wetted contact media and the sunlight, typically on the inlet side by also possibly on the outlet side of the contact body. Given the construction of the typical evaporative cooling apparatus, it is the first one-quarter to one inch of the channels of the media which will be exposed to sunlight and subject to the proliferation of algae in the presence of the light, nutrients and moisture.

One attempt to overcome these problems is proposed in U.S. Pat. No. 5,248,454 which discloses a gas-liquid contact body formed of a plurality of facially opposed corrugated sheets with the corrugation in alternate sheets being disposed in parallel to form a plurality of criss-crossing channels for gas and liquid. The air inlet side of the contact body has an air inlet portion coated with a water impermeable hydrophilic material containing an algaecide. That system does an excellent job of preventing algae growth and damage to the leading edge of the cooling media. However, the coating, which is usually formed of a water impervious material, creates an abrupt interface at the inner edge of the coating with the porous sheet. Because evaporative cooling pads are engineered with porous substrates that hold and transfer water the surface is 100% available for evaporation and the substrate evens out the distribution of water over the surface of the evaporative medium. The prior art solution of cooling the edges of the substrate inhibits evaporation at the edge of the cooling pad in the area where the air entering is hottest and driest.

It is an object of the present invention to provide a contact body for cooling towers and evaporative coolers which has improved operating efficiencies.

Another object of the present invention is to provide a contact body which has a self-cleaning air inlet and/or air outlet edge portion.

Another object of the present invention is to provide a contact body which has an edge portion which will resist the deposition and proliferation of algae.

BRIEF DESCRIPTION OF THE INVENTION

In accordance with an aspect of the present invention, a gas liquid contact body is provided for use in a gas liquid contact apparatus having a casing, in a gas inlet side and a gas outlet side. The contact body is formed of a plurality of corrugated sheets disposed in facially opposed relationship to one another and in substantially parallel relationship to one another in alternate sheets. The contact body defines a gas inlet edge adapted to be positioned adjacent to the gas inlet side of the casing.

The sheets of the contact body define a plurality of intersecting and inter-communicating passages allowing the passage of gas and liquid therethrough. The corrugations in each of the sheets extend at an angle to the main direction of flow of gas through the contact body, with the corrugations and alternate strips being disposed at an angle to the corrugations in the strips disposed between the alternate strips. The gas inlet edge of the contact body is coated with a water impermeable hydrophilic material containing an algicide of varying density from the edge of the sheets inwardly. The corrugations are preferentially coated so that the surfaces of the corrugations facing the sun are more densely coated and those facing away from the sun when installed are more lightly coated. The coating's coverage of these surfaces decreases inwardly from the edge of the sheets. As a result water can travel through the porous substrate to be made available for evaporation at the leading edge while the surfaces most susceptible to algae growth are protected.

BRIEF DESCRIPTION OF THE DRAWINGS

The above, and other objects, features and advantages of this invention will be apparent in the following detailed description of an illustrative embodiment thereof, which is to be read in connection with the accompanying drawings, wherein:

FIG. 5 is a schematic illustration of a spray booth for coating the edge portions of the contact body.

DETAILED DESCRIPTION OF PREFERRED EMBODIMENTS

Figure 1:
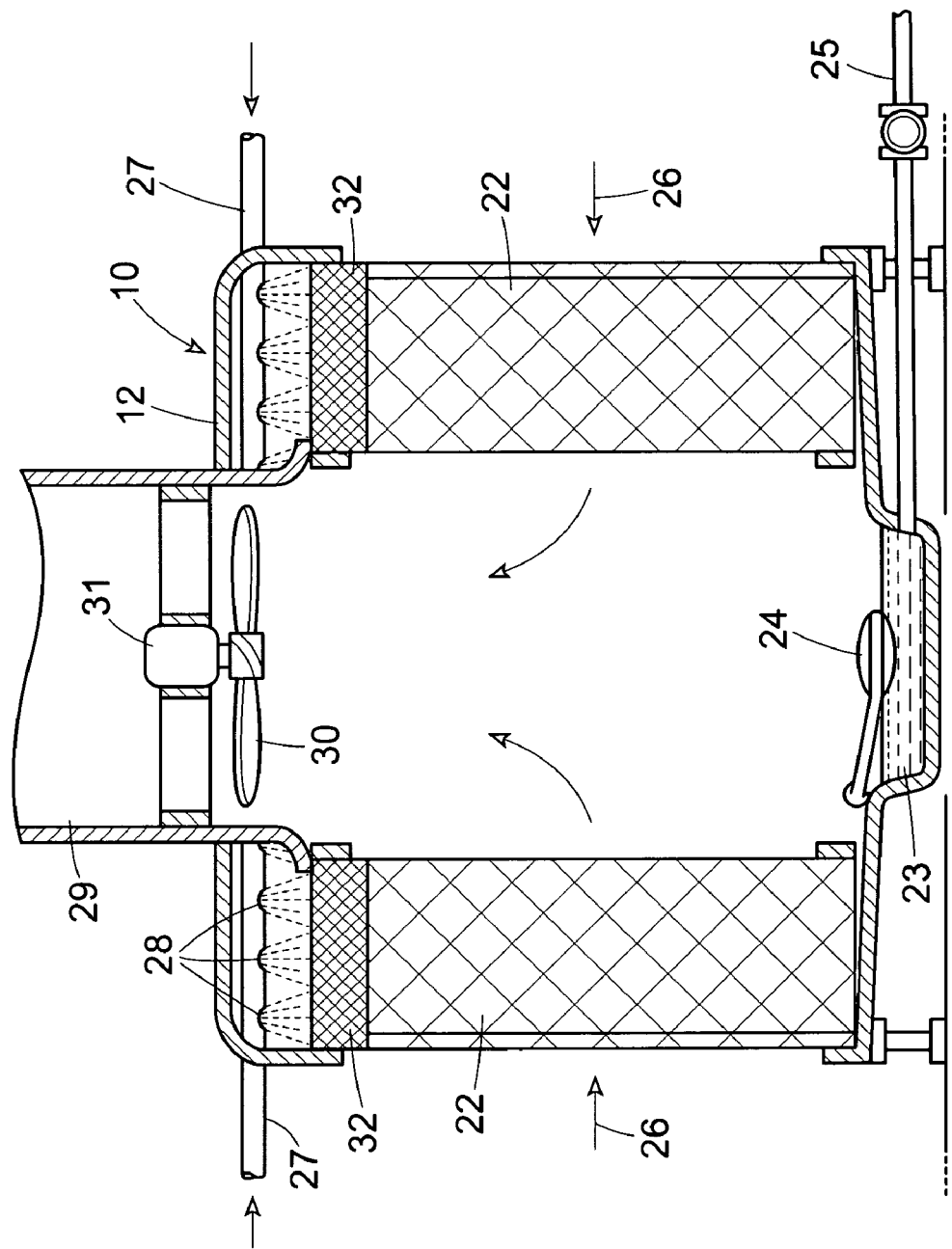
FIG. 1 is a vertical longitudinal sectional view of one embodiment of a cooling tower adapted to contain contact bodies constructed in accordance with the present invention.

Referring now to the drawings in detail, and initially to FIG. 1 thereof, a cooling tower 10 includes a casing 12 in which one or more contact bodies 22 constructed in accordance with the present invention are mounted. The base of casing 12 is formed into a sump 23 having a float 24 and drainage line 25. Gas, such as air, enters the channels or ducts within the contact bodies at the air inlet edge portion 26 thereof and is drawn upwardly, within the apparatus, to an outlet 29 equipped with a fan 30 and motor 31. Liquid, such as water, is introduced into the evaporative cooling apparatus or cooling tower through a liquid supply line 27 and escapes from the line through perforations or nozzles 28 or the like in the well known manner. The liquid escaping from the supply line 28 passes through a distribution pad 32 of conventional construction into the top of the contact bodies 22.

Figure 2:
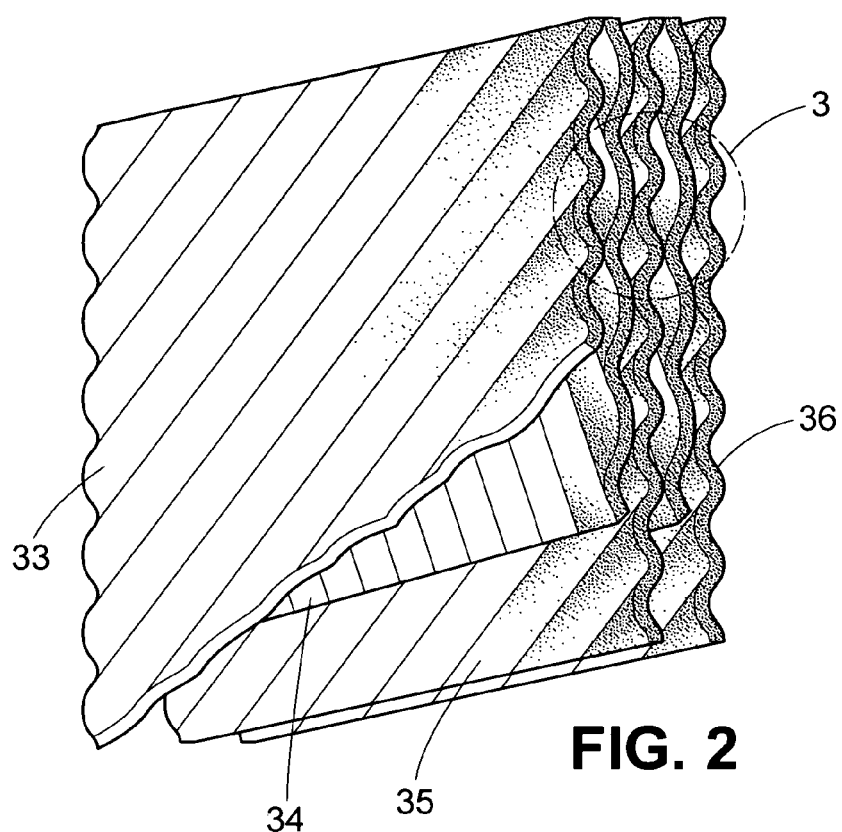
FIG. 2 is a perspective view, partly in section, of a contact body constructed in accordance with the present invention and adapted to be used in the tower of FIG. 1.
Figure 3:
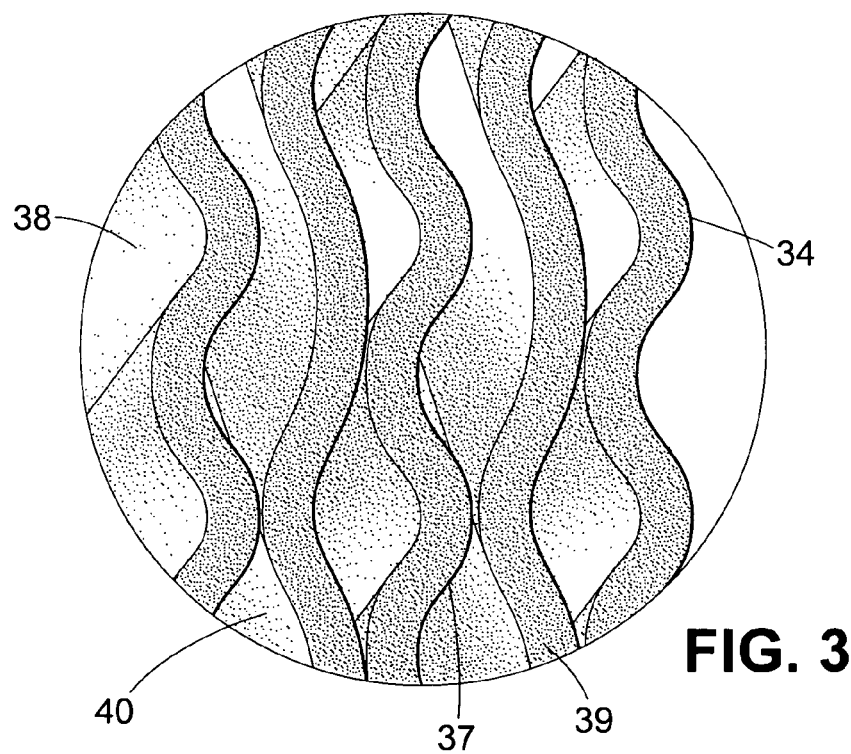
FIG. 3 is a fragmentary enlarged view of the air inlet edge portion of the contact body of FIG. 2.
Figure 4A:
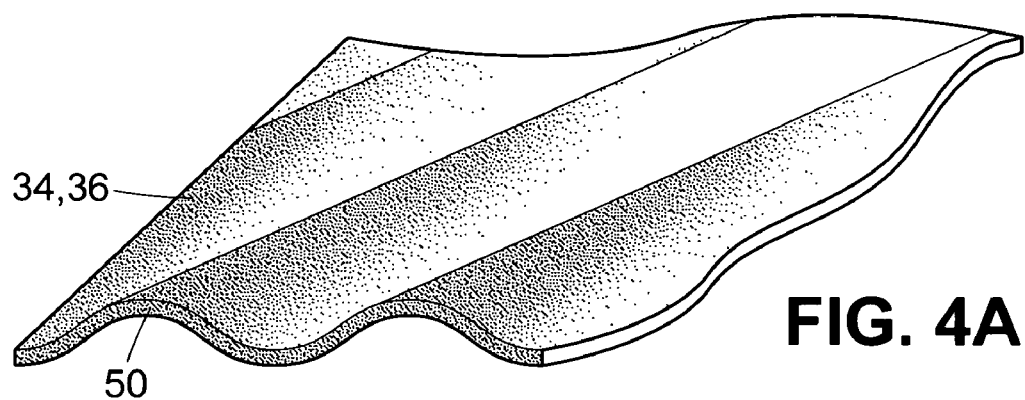
FIG. 4A is a further enlarged view of the edge of the air inlet portion of the single sheet of the contact body.
Figure 4B:
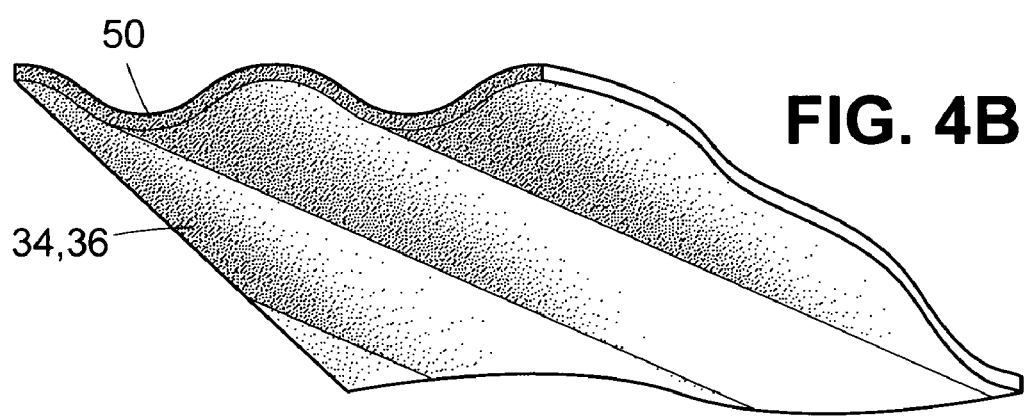
FIG. 4B is a view similar to FIG. 4A of the same sheet, inverted.

Contact body 22 in accordance with the present inventions is illustrated in greater detail in FIGS. 2 through 4. The body consists of a plurality of corrugated sheets 33, 34, 35, 36 with the corrugations in adjacent sheets, e.g. 33 and 34, being disposed at an angle to each other and the corrugations in alternate sheets, such as 33, 35, being disposed in parallel, whereby a plurality of crisscrossing passages are formed within the contact body. Preferably the sheets are positioned at unequal angles to each other as is known in the art.

As seen in FIG. 1, when the contact bodies are mounted in the evaporative cooling apparatus, the corrugations are generally at an angle relative to the horizontal so as to permit the gravity flow of liquid therethrough. The particular angular relationship of the sheets to one another, and to the horizontal, may be varied from apparatus to apparatus depending upon the particular construction to be achieved or function to be performed thereby.

Typically, the corrugations and the corrugated sheets have a height or amplitude up from 5 to 40 or 60 millimeters and a width of 10 to 30 millimeters. The corrugated sheets may be adhered to one another at points of contact within the contact body or may be held in a fixed position by suitable spacing and retaining means at their edges.

Contact bodies having the general construction illustrated in FIGS. 2, 3 and 4 have been formed from a variety of materials including corrugated plastic sheets or sheets of fibrous, woven or non-woven material, such as for example glass, Kraft paper, or cotton. Such fibrous materials are typically porous and may be impregnated with resins, as for example is discussed in U.S. Pat. No. 3,862,280 in order to provide a degree of rigidity and wet strength. As noted above, the contact body tends to collect dirt and dust passing through it with the air. At the edge of the contact bodies algae growth is encouraged by the exposure to sunlight, moisture and nutrients contained in the air and water passing over the contact body. This growth occurs principally on the surface portions of the corrugations that will be exposed to the sun on the inlet portions 26 of the contact bodies.

In accordance with the present invention, this problem with previously proposed contact bodies is overcome by the provision of a protective layer on at least the air inlet edge of the evaporative cooling media which will prevent deposition and absorption of solids and nutrients onto the substrate. By providing a protective surface which also dries out as soon as the water is turned off, algae growth is prevented.

More in particular, the air inlet edges of each of the sheets of corrugated material is coated with a water resistant, water impermeable material 40 which is hydrophilic. This feature of the material causes the water passing through the contact body to spread out on the surface of the coating into a thin film which continuously washes the edge of the contact body to remove dirt, spores, and other contamination therefrom. When the water is turned off, the edge dries immediately. Thus, it will not retain water which would otherwise sustain algae growth. Accordingly, the edge of the contact body is protected while the remainder of the contact body, which is not subject to the collection of dirt or the exposure of sunlight, functions in its usual way.

It has been found that a protective layer composed of a latex acrylic, rubber or plastic base material applied to the edge of the contact body adequately protects the contact body.

The protective layer is applied to the air inlet edge of the contact body by the apparatus shown in FIG. 5. More specifically, contact bodies 26, only one of which is shown in FIG. 5, are carried on a conveyor beneath a spray stand 52 in a spray enclosure (not shown).

The spray stand 52 includes a nozzle support bar 54 extending transversely across the path of conveyor 50. Bar 54 has a plurality of nozzle support arms 56 or the like mounted thereon. A spray nozzle 58 is adjustably mounted on each of the arms and connected by hoses 60 to a supply of the protective coating. The spray nozzles are of conventional construction and produce a fan like spray which, as seen in FIG. 5, is directed downwardly at an angle toward the upwardly facing inlet surface portion 26 of contact body 22. In the illustrative embodiment there are four nozzles 60, two (60a, 60b) facing down and in the direction of travel of the conveyor and the other two (60c and 60d) facing down and opposite the direction of travel of the conveyor.

The nozzle angles relative to the contact body moving beneath it can be adjusted in any known or convenient manner as would readily appear to those skilled in the liquid spraying arts.

The coating material is liquid and ejected from the nozzles in a fan like pattern that forms droplets of coating as it moves away from the nozzles. As will be apparent, the spray of coating droplets will be intersected by the surfaces of the corrugated sheets along inlet edge 26. The spray cannot penetrate deeply into the channels formed between the corrugations and becomes less dense the further in the droplets penetrate. Most droplets are captured by the surfaces of the corrugations that directly face the spray path and those surfaces block spray from hitting surfaces of adjacent corrugations immediately behind them. As a result the coating is most dense at the edges of the sheets and decreases in density further away from that edge leaving increasing surface area of the porous sheets exposed. In addition, portions of the corrugations which are blocked from spray by adjacent sheets have few if any droplets applied so that the porous sheet is exposed in those areas essentially up to the edge.

Thus, as seen in FIG. 2-4, the inclined surfaces 64, 66 of the corrugations are heavily coated at the edges 23 of the sheets and the central valleys 68 between them are essentially uncoated. It is only those inclined surfaces that will be exposed to the sun. Moreover, as best seen in FIG. 2 the density of the coating decreases at points away from edge 23 thereby exposing more and more of the porous sheets.

As a result of this arrangement, water can travel through the porous substrate up to the free edge thereof where it is available to the hottest and driest air for evaporation while still providing protection for the sheet edges and self cleaning anti-algae forming action. Thus, as compared to the prior art, far more surface area is available at edge portion 26 for evaporative cooling of the hot dry air.

As noted, the coating used in accordance with the present invention does not retain water because it is water impermeable. Therefore, it dries out completely when water stops being distributed through the contact body. Moreover, algae spores will not adhere to the coating because it is smooth and will not allow the algae to embed itself in the fibers of the substrate. Furthermore, algae spores which fall onto the edge are washed away with the water or moved into the contact body where they cannot be exposed to the sunlight. The coating also provides ultra violet protection to the edge portions of the sheet.

It has been found that a preferred coating for this purpose can be formulated as follows:

Latex rubber acrylic or plastic (i.e. PVC) 65-70 parts;
Kaolin or hydrated alumina 25-30 parts;
Titanium dioxide or carbon black 1-5 parts;
Silicone 0.001 to 1 part;
Other composition may also be used.

Although an illustrative embodiment of the present invention described herein with reference to the accompanying drawings, it is to be understood that the invention is not limited to that precise embodiment and that various changes and modifications may be affected therein by one skilled in the art without departing from the scope or spirit of this invention.

What is claimed is:

1. A gas-liquid contact body for use in a gas-liquid contact apparatus, said contact body comprising a plurality of facially opposed corrugated sheets with the corrugations in alternate sheets being disposed in parallel to form a plurality of criss-crossing channels for gas and liquid, said contact body having an air inlet side including an air inlet edge and an inlet edge portion downstream of said edge, said air inlet edge portion being coated with a water-impermeable hydrophilic material whose density of coverage decreases from a maximum of said air inlet edge downstream, within said air inlet portion to expose progressively increasing areas of said sheets to the air.

2. A gas-liquid contact body as defined in claim 1, wherein portions of said corrugated sheets in said inlet edge portion are essentially uncoated.

3. A gas-liquid contact body for use in a gas and liquid contact apparatus having a casing, a gas inlet side and a gas outlet side, said contact body comprising a plurality of corrugated sheets disposed in facially opposed relationship to one another and in substantially parallel relationship to one another and defining a gas inlet edge adapted to be positioned adjacent said gas inlet side of a casing, and a plurality of intersecting and intercommunicating passages allowing the passage of gas and liquid therethrough, the corrugations in each of said sheets extending at an angle to the main section of flow of the gas through the body with the corrugations in alternate strips being disposed at an angle to the corrugations in the adjacent strips, said sheets having a gas inlet edge and an inlet edge portion downstream of said edge being coated with a water-impermeable hydrophilic material whose density of coverage decreases from a maximum of said air inlet edge downstream, within said air inlet portion to expose progressively increasing areas of said sheets to the air.

4. A gas liquid contact body as defined in claim 3 wherein said coating includes a material selected from the group consisting of latex rubber, acrylic or plastic.

5. A gas-liquid contact body as defined in claim 3, wherein portions of said corrugated sheets in said inlet edge portion are essentially uncoated.

6. The method of coating an air inlet edge portion of a contact body comprising a plurality of facially opposed corrugated sheets comprising the step of:

moving said contact body relative to a plurality of coating spray nozzles with said air inlet edge portion facing the nozzles, positioning the nozzles at angles to the surface of the contact body; and spraying coating material in droplet form towards said contact body and its air inlet portion, whereby the density of the coating on the surfaces of the air inlet portion decrease from a maximum at the surface of the body facing the nozzles downstream within the air inlet portion to leave progressively increasing areas of said sheets exposed to air.

7. The method as defined in claim 6, including the step of directing the nozzles at an angle to the surface of the contact body whereby predetermined portions of the surface of the corrugations are sprayed with coating and other portions are blocked from spray by adjacent corrugations.

\* \* \* \* \*